(12) United States Patent
Ninomiya et al.

(10) Patent No.: US 11,066,810 B2
(45) Date of Patent: Jul. 20, 2021

(54) WORK VEHICLE AND CONTROL METHOD FOR WORK VEHICLE

(71) Applicant: KOMATSU LTD., Tokyo (JP)

(72) Inventors: Kiyotaka Ninomiya, Tokyo (JP); Takahisa Oasa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 32 days.

(21) Appl. No.: 16/496,171

(22) PCT Filed: Sep. 28, 2018

(86) PCT No.: PCT/JP2018/036429
§ 371 (c)(1),
(2) Date: Sep. 20, 2019

(87) PCT Pub. No.: WO2019/073827
PCT Pub. Date: Apr. 18, 2019

(65) Prior Publication Data
US 2020/0157772 A1 May 21, 2020

(30) Foreign Application Priority Data
Oct. 12, 2017 (JP) .............................. JP2017-198234

(51) Int. Cl.
*E02F 9/22* (2006.01)
*E02F 9/20* (2006.01)
(52) U.S. Cl.
CPC .......... *E02F 9/2296* (2013.01); *E02F 9/2004* (2013.01); *B60L 2200/40* (2013.01);
(Continued)

(58) Field of Classification Search
CPC ... E02F 3/437; E02F 3/439; E02F 9/20; E02F 9/2041; E02F 9/2296
See application file for complete search history.

(56) References Cited

U.S. PATENT DOCUMENTS 5,467,541 A 11/1995 Greer et al.
5,642,653 A 7/1997 Hutchison
(Continued)

FOREIGN PATENT DOCUMENTS

CN 201125402 Y 10/2008
CN 101377080 A 3/2009
(Continued)

OTHER PUBLICATIONS

The Office Action for the corresponding Chinese application No. 201880022372.0, dated Oct. 19, 2020.
(Continued)

*Primary Examiner* — Abiy Teka
(74) *Attorney, Agent, or Firm* — Global IP Counselors, LLP

(57) ABSTRACT

A work vehicle includes a vehicle body, a work implement attached to the vehicle body, an operating device configured to operate the work implement, a controller configured to drive the work implement at a driving speed corresponding to an operation amount of the operating device, and an input device. The controller is further configured to execute an automatic drive control in order to automatically drive the work implement as far as a predetermined position at a driving speed set in response to an operation amount of the operating device when the controller has received an input from the input device while the operating device is operated.

20 Claims, 4 Drawing Sheets

(52) U.S. Cl.
CPC .......... *E02F 9/2246* (2013.01); *E02F 9/2285* (2013.01); *E02F 9/2292* (2013.01); *F15B 2211/20576* (2013.01)

(56) References Cited

U.S. PATENT DOCUMENTS

| | | | |
|---|---|---|---|
| 10,036,141 B2 * | 7/2018 | Yokoo ................. | E02F 9/2012 |
| 2009/0056964 A1 | 3/2009 | Kunizawa et al. | |
| 2017/0292247 A1 | 10/2017 | Yokoo et al. | |

FOREIGN PATENT DOCUMENTS

| | | |
|---|---|---|
| EP | 2 811 139 A1 | 12/2014 |
| JP | 9-133105 A | 5/1997 |
| JP | 3893175 B2 | 3/2007 |
| JP | 2013-253436 A | 12/2013 |
| JP | 5917304 B2 | 5/2016 |
| WO | 2016/148311 A1 | 9/2016 |

OTHER PUBLICATIONS

The extended European search report for the corresponding European application No. 18866429.6, dated Nov. 23, 2020.
The International Search Report for the corresponding international application No. PCT/JP2018/036429, dated Dec. 11, 2018.

* cited by examiner

WORK VEHICLE AND CONTROL METHOD FOR WORK VEHICLE

CROSS-REFERENCE TO RELATED APPLICATIONS

This application is a U.S. National stage application of International Application No. PCT/JP2018/036429, filed on Sep. 28, 2018. This U.S. National stage application claims priority under 35 U.S.C. § 119(a) to Japanese Patent Application No. 2017-198234, filed in Japan on Oct. 12, 2017, the entire contents of which are hereby incorporated herein by reference.

BACKGROUND

Field of the Invention

The present invention relates to a work vehicle and a control method for the work vehicle.

Background Information

Conventionally, an automatic drive control (so-called detente control) is performed in a work vehicle such as a wheel loader or a bulldozer by automatically causing a work implement to be driven to a predetermined position for the purpose of repeatedly operating the work implement to the predetermined position easily and accurately (see Japanese Laid-Open Patent Publication No. 1-109-133105).

Execution of the automatic drive control described in Japanese Laid-Open Patent Publication No. H09-133105 is started by returning the operating lever of the work implement to the neutral position after the operating lever has been tilted as far as the maximum movement position.

SUMMARY

However, in the automatic drive control described in Japanese Laid-Open Patent Publication No. H09-133105, the operator is not able to cause the work implement to be driven at a desired driving speed because the work implement is constantly driven at the maximum driving speed.

Taking the above problem into consideration, an object of the present invention is to provide a work vehicle and a control method for the work vehicle with which an automatic drive control can be executed in which the work implement can be driven at a desired driving speed.

A work vehicle according to the present invention is provided with a vehicle body, a work implement attached to the vehicle body, an operating device for operating the work implement, a controller for causing the work implement to be driven at a driving speed in correspondence to an operation amount of the operating device, and an input device. The controller executes an automatic drive control at a driving speed set in response to the operation amount of the operating device when an input of the input device is received while the operating device is tilted.

According to the present invention, there is provided a work vehicle and a control method for a work vehicle with which an automatic drive control can be executed in which the work implement can be driven at a desired driving speed.

DETAILED DESCRIPTION OF EMBODIMENT(S)

An example of a "work vehicle" to which an "automatic drive control" according to the present invention is applied will be explained hereinbelow with reference to the drawings. However, the scope of the present invention is not limited to the following embodiments and may be changed as desired within the scope of the technical concept of the present invention.

For example, while a wheel loader provided with a bucket is cited as the work vehicle to which the automatic drive control according to the present invention is applied, the "automatic drive control" according to the present invention can be widely applied to any work vehicle.

In addition to a wheel loader, a bulldozer, a motor grader, a dump truck or the like may be cited as the work vehicle. In addition, the work vehicle may be provided with an attachment such as a fork instead of the bucket as the work implement.

In the present description, "front" is a term that indicates the forward direction of the work vehicle, and "rear" indicates the reverse direction of the work vehicle. In addition, "left" and "right" are terms relative to the traveling direction when the work vehicle is traveling forward.

(Wheel Loader 1)

Figure 1:
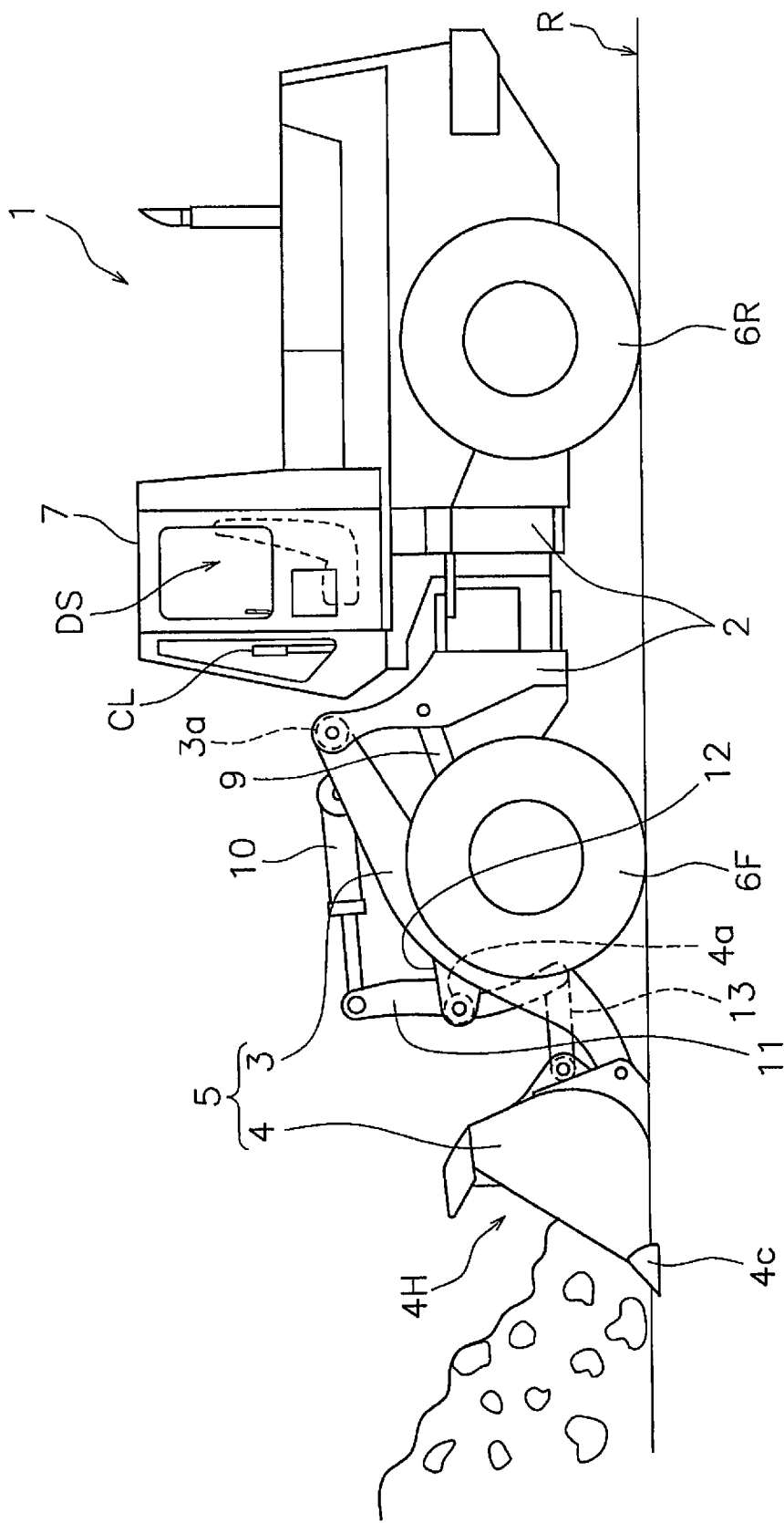
FIG. 1 is side view of a wheel loader.

FIG. 1 is a side view of a wheel loader 1 according to the present embodiment.

The wheel loader 1 is provided with a vehicle body 2, a work implement 5, front wheels 6F, rear wheels 6R, an operating cabin 7, a boom cylinder 9, and a bucket cylinder 10.

The work implement 5, the front wheels 6F, the rear wheels 6R, and the operating cabin 7 are attached to the vehicle body 2. An operator's seat DS on which the operator sits, and an operating lever CL (example of an operating device) for operating the work implement 5 are disposed inside the operating cabin 7.

The work implement 5 is attached at the front of the vehicle body 2. The work implement 5 has a boom 3 and a bucket 4. The boom 3 extends from the vehicle body 2 in the forward direction. The boom 3 is supported by the vehicle body 2 in a manner that allows rotating up and down. A boom angle detection sensor 3a is disposed at a base end part of the boom 3. The boom angle detection sensor 3a detects the angle of the boom 3 with respect to the horizontal direction. In the present embodiment, the automatic drive control is executed for automatically driving the boom 3 to a predetermined position. The automatic drive control of the boom 3 is explained below.

The bucket 4 has an open part 4H and a claw 4C. The bucket 4 scoops a load of sand or gravel and the like with the claw 4C. The load scooped with the claw 4C enters into the bucket 4 from the open part 4H. The bucket 4 is attached to a tip end part of the boom 3. The bucket 4 is supported by the boom 3 in a manner that allows tilting forward and backward. In the present description, causing the bucket 4 to be rotated in a backward sloping direction is called "tilting"

and causing the bucket 4 to be rotated in a forward sloping direction is called "dumping."

The front wheels 6F and the rear wheels 6R are in contact with a road surface R. The wheel loader 1 travels due to the front wheels 6F and the rear wheels 6R rotating on the road surface R. The wheel loader 1 is steered by bending the vehicle body 2 between the front wheels 6F and the rear wheels 6R.

The boom cylinder 9 is coupled to the vehicle body 2 and the boom 3. The boom 3 rotates up and down due to the extension and contraction of the boom cylinder 9. The bucket cylinder 10 is coupled to the vehicle body 2 and an upper end part of a bell crank 11. The bell crank 11 is rotatably supported at the tip end part of a supporting member 12 that is fixed to the boom 3. A lower end part of the bell crank 11 is coupled to the bucket 4 via a coupling member 13. The bucket 4 tilts forward and backward around a portion supported by the boom 3 due to the extension and contraction of the bucket cylinder 10. A bucket angle detection sensor 4a is disposed at the tip end part of the supporting member 12. The bucket angle detection sensor 4a detects the angle of the bottom surface of the bucket 4 with respect to the horizontal direction.

The operating lever CL is used for operating the boom 3 by controlling the extension and contraction of the boom cylinder 9. In the present embodiment, the boom 3 is lowered when the operating lever CL is tilted forward, and the boom 3 is raised when the operating lever CL is tilted backward. The operating lever CL is used for operating the bucket 4 by controlling the extension and contraction of the bucket cylinder 10. In the present embodiment, the bucket 4 is dumped when the operating lever CL is tilted to the left, and the bucket 4 is tilted when the operating lever CL is tilted to the right.

(Control System of Wheel Loader 1)

Figure 2:
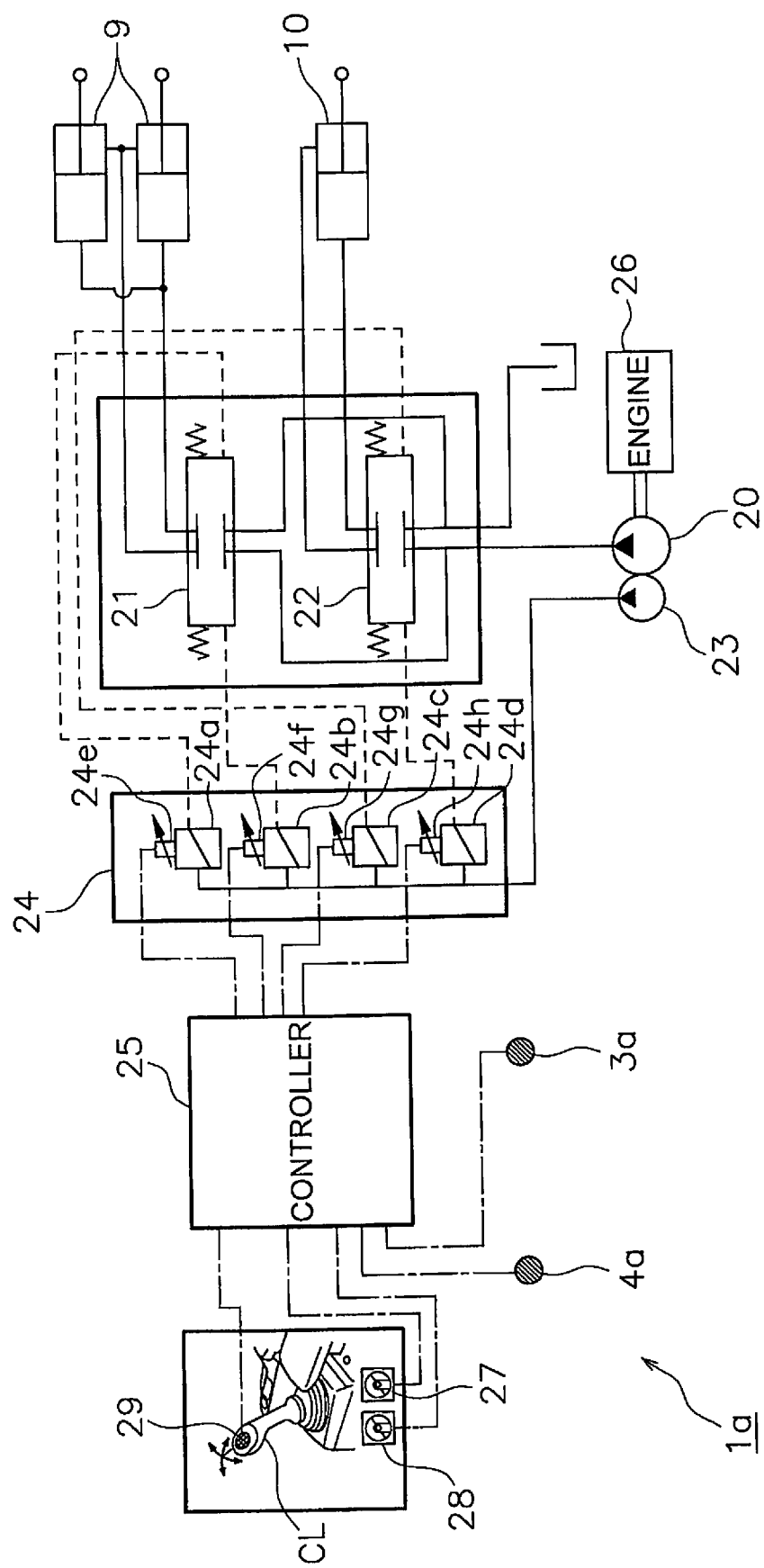
FIG. 2 is a block diagram illustrating a control system of the wheel loader.

FIG. 2 is a block diagram illustrating a control system 1a for controlling the operations of the wheel loader 1.

The control system 1a of the wheel loader 1 is provided with a work implement pump 20, a boom operation valve 21, a bucket operation valve 22, a pilot pump 23, a work implement electronic control valve 24, and a controller 25.

The work implement pump 20 is driven by an engine 26 as a force generation source mounted in the wheel loader 1. The work implement pump 20 discharges hydraulic fluid to the boom operation valve 21 and the bucket operation valve 22.

The boom operation valve 21 and the bucket operation valve 22 are both hydraulic pilot-type operation valves. The boom operation valve 21 is connected to the boom cylinder 9 and the bucket operation valve 22 is connected to the bucket cylinder 10.

The boom operation valve 21 is a three position switching valve that is able to switch between a position for raising the boom 3, a position for stopping the boom 3, and a position for lowering the boom 3. The bucket operation valve 22 is a three position switching valve that is able to switch between a position for dumping the bucket 4, a position for stopping the bucket 4, and a position for tilting the bucket 4.

The respective pilot pressure receiving parts of the boom operation valve 21 and the bucket operation valve 22 are connected to the work implement electronic control valve 24 via the pilot pump 23. The pilot pump 23 is driven by the engine 26. The pilot pump 23 supplies hydraulic fluid at a pilot pressure to the respective pilot pressure receiving parts of the boom operation valve 21 and the bucket operation valve 22 via the work implement electronic control valve 24.

The work implement electronic control valve 24 has a boom lowering control valve 24a, a boom raising control valve 24b, a bucket dump control valve 24c, and a bucket tilt control valve 24d. The boom lowering control valve 24a and the boom raising control valve 24b are connected respectively to a pair of pilot pressure receiving parts of the boom operation valve 21. The bucket dump control valve 24c and the bucket tilt control valve 24d are connected respectively to a pair of pilot pressure receiving parts of the bucket operation valve 22. Command signals from the controller 25 are inputted respectively to a solenoid command part 24e of the boom lowering control valve 24a, a solenoid command part 24f of the boom raising control valve 24b, a solenoid command part 24g of the bucket dump control valve 24c, and a solenoid command part 24h of the bucket tilt control valve 24d.

The boom operation valve 21, the boom lowering control valve 24a, the boom raising control valve 24b, and the boom cylinder 9 function as a boom driving part for rotating (raising and lowering) the boom 3 up and down. The bucket operation valve 22, the bucket dump control valve 24c, the bucket tilt control valve 24d, and the bucket cylinder 10 function as a bucket driving part for tilting (tilting and dumping) the bucket 4.

The controller 25 is, for example, a computer. The controller 25 includes a processing part such as a central processing unit (CPU) or the like, and a storage unit such as a read only memory (ROM) or the like. The controller 25 controls the operation of the work implement 5 by consecutively executing various commands stored in a computer program.

The controller 25 is connected to a boom lever potentiometer 27, a bucket lever potentiometer 28, an automatic drive control button 29, the boom angle detection sensor 3a, and the bucket angle detection sensor 4a.

The boom lever potentiometer 27 is provided on the operating lever CL. The boom lever potentiometer 27 detects the operation amount of the operating lever CL in the front-back direction. The bucket lever potentiometer 28 is provided on the operating lever CL. The bucket lever potentiometer 28 detects the operation amount of the operating lever CL in the left-right direction.

The controller 25 causes the boom 3 to rotate up when the operating lever CL is tilted forward. The controller 25 causes the boom 3 to rotate down when the operating lever CL is tilted backward. In the above cases, the controller 25 drives the boom 3 at a driving speed corresponding to the amount of tilt of the operating lever CL to the front or back as illustrated in FIG. 3.

Figure 3:
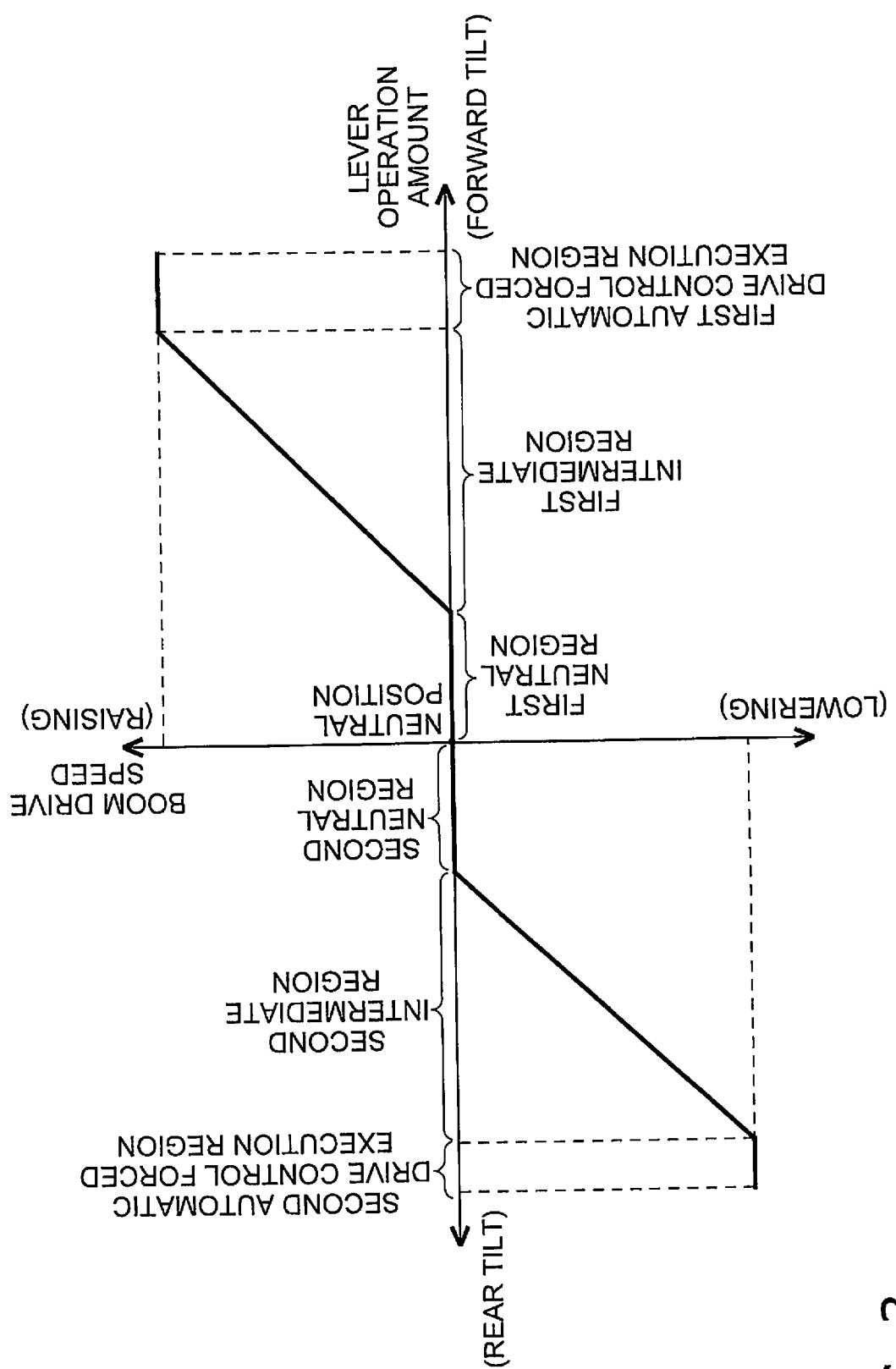
FIG. 3 is a graph indicating the relationship between the amount of tilt of an operating lever and the driving speed of a boom.

In the example illustrated in FIG. 3, when the operating lever CL is tilted forward, the operating lever CL can be tilted in order between a first neutral region that includes the neutral position, a first intermediate region that connects to the first neutral region and in which the operation amount is larger than in the first neutral region, and a first automatic drive control forced execution region that connects to the first intermediate region and in which the operation amount is larger than in the first intermediate region. The barrier between the first intermediate region and the first automatic drive control forced execution region is desirably provided with a click feeling (recoil feeling) in the operating lever CL. The first neutral region is a so-called dead zone region. When the operating lever CL is positioned in the first neutral region, the controller 25 does not drive the boom 3. When the operating lever CL is in the first neutral region, the controller 25 does not execute the automatic drive control of the boom 3 even if an input of an execution instruction of the automatic drive control is received via the belowmentioned automatic drive control button 29. When the operating lever CL is positioned in the first intermediate region, the controller 25 drives the boom 3. When the operating lever CL is positioned in the first intermediate region, the controller 25 correspondingly increases the driving speed (raising speed) of the boom 3 as the operation amount of the operating lever CL increases. When the operating lever CL is in the first automatic drive control forced execution region, the controller 25 executes the automatic drive control of the boom 3 in the upward direction regardless of whether an input of an execution instruction of the automatic drive control is received or not from the below mentioned automatic drive control button 29. Specifically, when the operating lever CL enters the first automatic drive control forced execution region, the controller 25 automatically raises the boom 3 to a predetermined raised position (example of a predetermined position). At this time, the controller 25 raises the boom 3 at the maximum driving speed. When the controller 25 detects that the boom 3 has reached the raised position on the basis of the detection value of the boom angle detection sensor 3a, the controller 25 stops raising the boom 3. The raised position of the boom 3 can be previously set to any position. The raised position of the boom 3 may be the maximum operating position of the boom cylinder 9, or may be a position between the maximum operating position and the minimum operating position of the boom cylinder 9.

Moreover, in the example illustrated in FIG. 3, when the operating lever CL is tilted backward, the operating lever CL can be tilted in order between a second neutral region that includes the neutral position, a second intermediate region that connects to the second neutral region, and a second automatic drive control forced execution region that connects to the second intermediate region. The barrier between the second intermediate region and the second automatic drive control forced execution region is desirably provided with a click feeling (recoil feeling) in the operating lever CL. The second neutral region is a so-called dead zone region. When the operating lever CL is positioned in the second neutral region, the controller 25 does not drive the boom 3. When the operating lever CL is positioned in the second neutral region, the controller 25 does not execute the automatic drive control of the boom 3 even if an input of an execution instruction of the automatic drive control is received from the below mentioned automatic drive control button 29. When the operating lever CL is positioned in the second intermediate region, the controller 25 correspondingly increases the driving speed (lowering speed) of the boom 3 as the operation amount of the operating lever CL increases. When the operating lever CL is in the second automatic drive control forced execution region, the controller 25 executes the automatic drive control of the boom 3 in the downward direction regardless of whether an input of an execution instruction of the automatic drive control is received or not via the automatic drive control button 29. Specifically, when the operating lever CL enters the second automatic drive control forced execution region, the controller 25 automatically lowers the boom 3 to a predetermined lowered position (example of a predetermined position). At this time, the controller 25 lowers the boom 3 at the maximum driving speed. When the controller 25 detects that the boom 3 has reached the lowered position on the basis of a detection value of the boom angle detection sensor 3a, the controller 25 stops lowering the boom 3. The lowered position of the boom 3 can be previously set to any position. The lowered position of the boom 3 may be the maximum operating position of the boom cylinder 9, or may be a position between the maximum operating position and the minimum operating position of the boom cylinder 9. However, the lowered position of the boom 3 is set to be lower than the abovementioned raised position.

The controller 25 also dumps the bucket 4 when the operating lever CL is tilted to the left. The controller 25 tilts the bucket 4 when the operating lever CL is tilted to the right. In the above cases, the controller 25 drives the bucket 4 at a driving speed corresponding to the amount of tilting to the left and right on the basis of a graph similar to that of FIG. 3.

The automatic drive control button 29 is provided at the upper end part of the operating lever CL. The operator is able to press the automatic drive control button 29 with a finger while operating the operating lever CL to the front and back or to the left and right with the palm of the hand. The automatic drive control button 29 is an example of an "input device" for the operator to input an execution instruction or an end instruction of the automatic drive control. When the automatic drive control button 29 is pressed when the automatic drive control of the boom 3 is not being executed, the automatic drive control button 29 outputs the execution instruction of the automatic drive control of the boom 3 to the controller 25. Moreover, when the automatic drive control button 29 is pressed when the automatic drive control of the boom 3 is being executed, the automatic drive control button 29 outputs the end instruction of the automatic drive control of the boom 3 to the controller 25.

In the present embodiment, when the controller 25 receives the input of the execution instruction from the automatic drive control button 29 while the operating lever CL is tilted forward, the controller 25 executes the automatic drive control at the raising speed set in response to the amount of tilting of the operating lever CL. Specifically, when the operating lever CL is positioned in the first intermediate region indicated in FIG. 3, the controller 25 automatically raises the boom 3 to the abovementioned raised position upon receiving the input of the execution instruction for the automatic drive control from the automatic drive control button 29. At this time, the controller 25 sets the raising speed corresponding to the amount of tilting of the operating lever CL in accordance with the graph illustrated in FIG. 3, and maintains the raising speed until the boom 3 reaches the raised position. The controller 25 is able to maintain the raising speed of the boom 3 by adjusting each of the opening degree of the boom operation valve 21, the rotation speed of the work implement pump 20, and the capacity of the work implement pump 20. When the controller 25 detects that the boom 3 has reached the raised position on the basis of the detection value of the boom angle detection sensor 3a, the controller 25 stops raising the boom 3.

Similarly, when the controller 25 receives the input of the execution instruction from the automatic drive control button 29 while the operating lever CL is tilted backward, the controller 25 executes the automatic drive control at the lowering speed set in response to the amount of tilting of the operating lever CL. Specifically, when the operating lever CL is positioned in the second intermediate region indicated in FIG. 3, the controller 25 automatically lowers the boom 3 to the abovementioned lowered position upon receiving the input of the execution instruction for the automatic drive control from the automatic drive control button 29. At this time, the controller 25 sets the lowering speed corresponding to the amount of tilting of the operating lever CL in accordance with the graph illustrated in FIG. 3, and maintains the lowering speed until the boom 3 reaches the lowered position. The controller 25 is able to maintain the lowering speed of the boom 3 by adjusting each of the opening degree of the boom operation valve 21, the rotation speed of the work implement pump 20, and the capacity of the work implement pump 20. When the controller 25 detects that the boom 3 has reached the lowered position on the basis of a detection value of the boom angle detection sensor 3a, the controller 25 stops lowering the boom 3.

In this way, when the controller 25 according to the present embodiment receives the input of the execution instruction from the automatic drive control button 29 while the operating lever CL is tilted, the controller 25 executes the automatic drive control at the driving speed set in response to the amount of tilting of the operating lever CL. As a result, when, for example, the operator desires to execute the automatic drive control of the boom 3 at a slow speed, the operator is able to execute the automatic drive control at a desired speed set by the operator himself.

After the operator has pressed the automatic drive control button 29 and started the automatic drive control of the boom 3, the operating lever CL is configured so as to return to the neutral position when the operator takes his hand off the operating lever CL. When the operator moves the operating lever CL to a position other than the first or second neutral region after the operating lever CL has returned to the neutral position, the controller 25 ends the automatic drive control of the boom 3 regardless of whether or not the boom 3 has reached the predetermined position. As a result thereof, the operator can promptly disconnect the automatic drive control at his own discretion because the operations by the operator can be prioritized.

In addition, the controller 25 ends the automatic drive control upon receiving an input of the end instruction (namely, pressing the automatic drive control button 29 a second time) from the automatic drive control button 29 during the execution of the automatic drive control. As a result thereof, the operator can promptly disconnect the automatic drive control at his own discretion even while the automatic drive control of the boom 3 is being executed.

(Automatic Drive Control of Boom 3)

Figure 4:
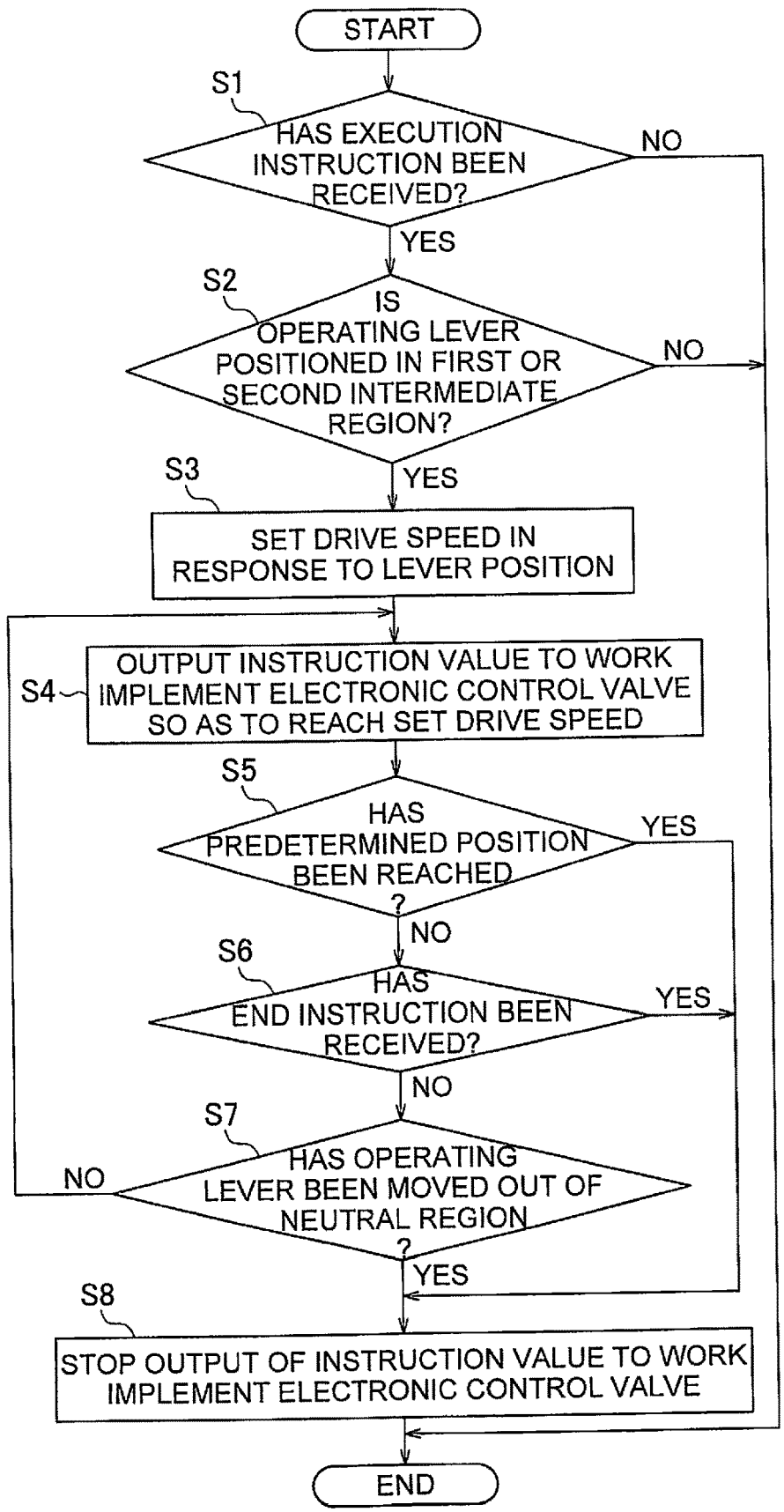
FIG. 4 is a flow chart for explaining the automatic drive control of the boom.

The automatic drive control of the boom 3 performed by the controller 25 will be discussed next with reference to FIG. 4. FIG. 4 is a flow chart for explaining the automatic drive control of the boom 3.

In step S1, the controller 25 determines whether an input of the execution instruction has been received from the automatic drive control button 29. If no input of the execution instruction has been received from the automatic drive control button 29, the processing is ended. If an input of the execution instruction is received from the automatic drive control button 29, the processing advances to step S2.

In step S2, the controller 25 determines whether the operating lever CL is tilted. Specifically, the controller 25 determines whether the position of the operating lever CL is in the first or second intermediate region. If the operating lever CL is not positioned in the first or second intermediate region, the processing is ended. If the operating lever CL is positioned in the first or second intermediate region, the processing advances to step S3.

In step S3, the controller 25 refers to the graph of FIG. 3 and sets the driving speed (raising or lowering speed) in the automatic drive control of the boom 3.

In step S4, the controller 25 outputs a command value to the work implement electronic control valve 24 so that the driving speed of the boom 3 meets the desired value.

In step S5, the controller 25 determines whether the boom 3 has reached the predetermined position (raised or lowered position). When the boom 3 reaches the predetermined position, the processing advances to step S8. If the boom 3 has not reached the predetermined position, the processing advances to step S6.

In step S6, the controller 25 determines whether an input of the end instruction has been received from the automatic drive control button 29. If an input of the end instruction has not been received from the automatic drive control button 29, the processing advances to step S7. If the input of the end instruction is received from the automatic drive control button 29, the processing advances to step S8.

In step S7, the controller 25 determines whether the operating lever CL has been moved outside of the first or second neutral region after the operating lever CL has been returned to the neutral position. If the operating lever CL has not been moved outside of the first or second neutral region, the processing returns to step S4, and the automatic drive control of the boom 3 is continued. If the operating lever CL has been moved outside of the first or second neutral region, the processing advances to step S8.

In step S8, the controller 25 stops the output of the command value to the work implement electronic control valve 24. As a result, the automatic drive control of the boom 3 is ended.

(Other Embodiments)

While the "automatic drive control" according to the present invention involves both raising and lowering the boom in the above embodiment, only one of raising or lowering may performed in the automatic drive control.

While the execution of the "automatic drive control" according to the present invention involves the boom 3 in the above embodiment, the "automatic drive control" according to the present invention may be executed on at least one of the dumping and tilting of the bucket 4. In addition, the "automatic drive control" according to the present invention can be executed on another attachment such as a fork that is attached in place of the bucket 4. Furthermore, the "automatic drive control" according to the present invention can be executed on a blade provided on a bulldozer, a blade provided on a motor grader, or a dump body provided on a dump truck.

While the controller 25 in the above embodiment maintains the driving speed set in accordance with the graph illustrated in FIG. 3 in the automatic drive control of the boom 3, the present invention is not limited in this way. The controller 25 may increase the driving speed in response to a pressing amount of an accelerator pedal when the accelerator pedal is pressed by the operator for controlling the rotation speed of the engine 26 during the automatic drive control. As a result, when the operator feels that the driving speed of the boom 3 is slow during the automatic drive control, the driving speed of the boom 3 can be easily increased to the desired speed without resetting the automatic drive control.

The invention claimed is:

1. A work vehicle comprising:
a vehicle body;
a work implement attached to the vehicle body;
an operating device configured to operate the work implement;
a controller configured to drive the work implement at a driving speed corresponding to an operation amount of the operating device; and
an input device configured to be operated by an operator to execute an automatic drive control, the controller being further configured to execute the automatic drive control in response to an input from the input device while the operating device is being operated, the automatic drive control being a control to automatically drive the work implement as far as a predetermined position at a driving speed set in response to an operation amount of the operating device.

2. The work vehicle according to claim 1, wherein
the input device is configured to output, to the controller, an execution instruction of the automatic drive control, and
the controller is further configured to execute the automatic drive control when the controller has received an input of the execution instruction from the input device while the operating device is operated.

3. The work vehicle according to claim 1, wherein
the operating device is configured to operate in a neutral region including a neutral position, and an intermediate region in which the operation amount is larger than the neutral region, and
the controller is further configured to execute the automatic drive control when the controller has received the input from the input device while the operating device is positioned in the intermediate region.

4. The work vehicle according to claim 3, wherein
the operating device is further configured to operate in an automatic drive control forced execution region in which the operation amount is larger than the intermediate region, and
the controller is further configured to execute the automatic drive control at a maximum driving speed when the controller has received the input from the input device while the operating device is positioned in the automatic drive control forced execution region.

5. The work vehicle according to claim 3, wherein
the controller is further configured to not execute the automatic drive control when the controller has received the input from the input device while the operating device is positioned in the neutral region.

6. The work vehicle according to claim 1, wherein
the controller is further configured to end the automatic drive control when the controller has received the input from the input device during the execution of the automatic drive control.

7. The work vehicle according to claim 1, wherein,
the controller is further configured to end the automatic drive control when the operating device is moved outside of the neutral region which includes the neutral position after being moved into the neutral region during the execution of the automatic drive control.

8. The work vehicle according to claim 1, further comprising:
a work implement actuator configured to drive the work implement,
the predetermined position being a maximum operating position or a minimum operating position of the work implement actuator.

9. The work vehicle according to claim 1, further comprising:
a work implement actuator for driving the work implement,
the predetermined position being a position previously set between a maximum operating position and a minimum operating position of the work implement actuator.

10. The work vehicle according to claim 1, wherein
the work implement has a boom rotatably attached to the vehicle body and a bucket rotatably attached to the boom, and
the controller is further configured to execute the automatic drive control during at least one of raising and lowering the boom.

11. The work vehicle according to claim 1, wherein
the work implement has a boom rotatably attached to the vehicle body and a bucket rotatably attached to the boom, and
the controller is further configured to execute the automatic drive control during at least one of dumping and tilting the bucket.

12. A work vehicle comprising:
a vehicle body;
a work implement attached to the vehicle body;
an operating device configured to operate the work implement;
a controller configured to drive the work implement at a driving speed corresponding to an operation amount of the operating device;
an input device; and
an accelerator pedal configured to control a rotation speed of an engine,
the controller being configured to execute an automatic drive control in order to automatically drive the work implement as far as a predetermined position at a driving speed set in response to an operation amount of the operating device when the controller has received an input from the input device while the operating device is operated, and
the controller being further configured to increase the driving speed in response to a pressing amount of the accelerator pedal when the accelerator pedal is pressed during the execution of the automatic drive control.

13. A control method for a work vehicle, the method comprising:
an operation step in which an operating device is operated to operate a work implement attached to a vehicle body;
a first receiving step in which an input from an input device is received in response to operation of the input device by an operator; and
an execution step in which an automatic drive control is executed in response to receiving the input from the input device during the operation step, the automatic drive control being a control to automatically drive the work implement as far as a predetermined position at a driving speed set in response to an operation amount of the operating device.

14. The control method for a work vehicle according to claim 13, wherein
in the first receiving step, an input of an execution instruction of the automatic drive control is received from the input device.

15. The control method for a work vehicle according to claim 13, wherein
in the operation step, the operating device is positioned in an intermediate region in which an operation amount is larger than a neutral region that includes a neutral position.

16. The control method for a work vehicle according to claim 15, wherein
in the execution step, the automatic drive control is executed at a maximum driving speed when the operating device is positioned in an automatic drive control forced execution region in which the operation amount is larger than the intermediate region in the operation step.

17. The control method for a work vehicle according to claim 15, wherein
in the execution step, the automatic drive control is not executed when the operating device is positioned in the neutral region in the operation step.

18. The work method for a work vehicle according to claim 13, the method further comprising:
a second receiving step in which an input of the input device is received after the execution step, and
an end step in which the automatic drive control is ended.

19. The control method for a work vehicle according to claim 13, the method further comprising:
a moving step in which the operating device is moved outside of the neutral region which includes a neutral position after moving the operating device inside the neutral position after the execution step, and
an end step in which the automatic drive control is ended.

20. The control method for a work vehicle according to claim 13, wherein
in the execution step, the predetermined position is a maximum operating position or a minimum operating position of a work implement actuator for driving the work implement.

* * * * *